United States Patent
Hull

[11] Patent Number: 5,390,426
[45] Date of Patent: Feb. 21, 1995

[54] TAPE MEASURE CLIP

[76] Inventor: Anthony K. Hull, 169 Louth Street, St. Catharines, Ontario, Canada, L2S 2R4

[21] Appl. No.: 71,098

[22] Filed: Jun. 4, 1993

[51] Int. Cl.⁶ ............................ G01B 3/10; B43L 7/00
[52] U.S. Cl. ........................................ 33/770; 33/760
[58] Field of Search ................ 33/769, 755, 759, 760, 33/761, 768, 770, 668, 484, 485, 429, 474, 479, 480

[56] References Cited

U.S. PATENT DOCUMENTS

| | | | |
|---|---|---|---|
| 2,571,569 | 10/1951 | Greenwood | 33/484 |
| 4,200,984 | 5/1980 | Fink | 33/755 |
| 4,227,314 | 10/1980 | Schliep | 33/484 |
| 4,700,489 | 10/1987 | Vasile | 33/760 |
| 4,967,482 | 11/1990 | Hoover et al. | 33/427 |
| 5,077,910 | 1/1992 | Smith | 33/760 |
| 5,113,596 | 5/1992 | Meyers | 33/759 |
| 5,134,784 | 8/1992 | Atienza | 33/769 |

Primary Examiner—Christopher W. Fulton

[57] ABSTRACT

In accordance with the present invention, there is provided a clip for use with a tape measure comprising a generally U-shaped channel sized to permit a standard tape measure to be retained in the channel. The channel is provided with a horizontal slot cut in the lower edge of opposite sides of the channel adjacent one end. The slots are sized to permit the ruler of a square or other straight edge to be inserted and held in place between the bottom of the tape measure and the floor of the channel. This configuration permits the square and tape to move as one, so that the tape may be read as it passes over the outside edge of the edge of the blade of the square and a mark may be scribed at any point across the top of the material without hindrance and the user will have one hand free to scribe the mark.

4 Claims, 2 Drawing Sheets

TAPE MEASURE CLIP

BACKGROUND OF THE INVENTION

1. Field of the invention

This invention relates to construction tools and, more particularly, to a clip for use with a tape measure to assist persons in measuring, marking and scribing projects.

2. Description of the Prior Art

In wooden frame construction, a common method by which stud work is marked is to lay the top and bottom plates together along their lengths on a level surface with their combined thicknesses facing up. A tape is started at one end and as it is unrolled the operator marks on the material where the studs will be fastened. The operator must then return along the length of the material with a square and scribe a line across both pieces of material at each previous mark. This means that, although this method has a high degree of accuracy, the operator must pass twice along the material, which is time consuming.

Another method is to replace the tape measure with a 16" or 24" square which means that although the location of the individual studs may be measured and scribed in one operation, the operator must be able to either add together the inches as he advances along the length of material while trying to calculate where window and or door openings might go, or they may multiply the number of stud widths. Either way it is time consuming and subject to errors.

SUMMARY OF THE INVENTION

The present invention solves the problem of using a tape and square permitting them to be used at the same time and with one hand thus allowing one hand free to scribe the work piece.

Thus, in accordance with the present invention, there is provided a clip for use with a tape measure comprising a generally U-shaped channel sized to permit a standard tape measure to be retained in the channel. The channel is provided with a horizontal slot cut in the lower edge of opposite sides of the channel adjacent one end. The slots are sized to permit the ruler of a square or other straight edge to be inserted and held in place between the bottom of the tape measure and the floor of the channel.

The clip of the present invention may be made from steel or plastic into which a tape measure is inserted and then held in place inside the clip by pressure. The blade of the tape is free to protrude through an opening in the clip. The blade of the square, known as the ruler can then be inserted in the slot provided in the clip and held in place by the tape. This configuration permits the square and tape to move as one. The tape and clip do not fully cover the blade of the square, so that the tape may be read as it passes over the outside edge of the edge of the blade of the square, being the edge that the scribed mark will be made against. A mark may be scribed at any point across the top of the material without hindrance and the user will have one hand free to scribe the mark.

In another embodiment the present invention relates to a tape measure having a housing and a retractable tape contained therein. The present invention provides an improvement in the structure of such tape measures by comprising a horizontal slot formed in the housing at the front face of the tape measure beneath the opening where the tape protrudes. A ruler of a square or other straight edge can be inserted in the slot so that an operator can measure with one hand and scribe with the other.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 1:
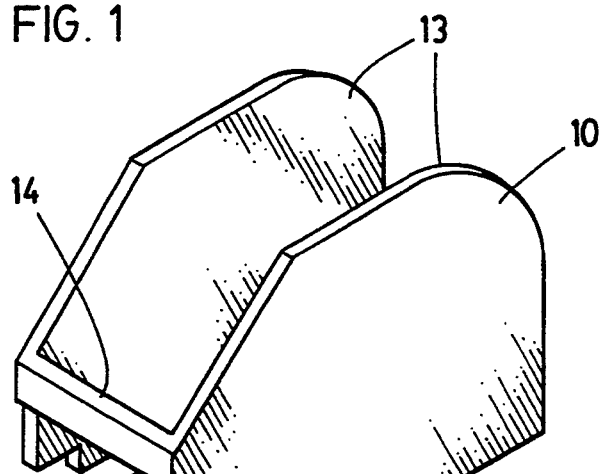
FIG. 1 is perspective view of a clip made in accordance with the present invention.
Figure 2:
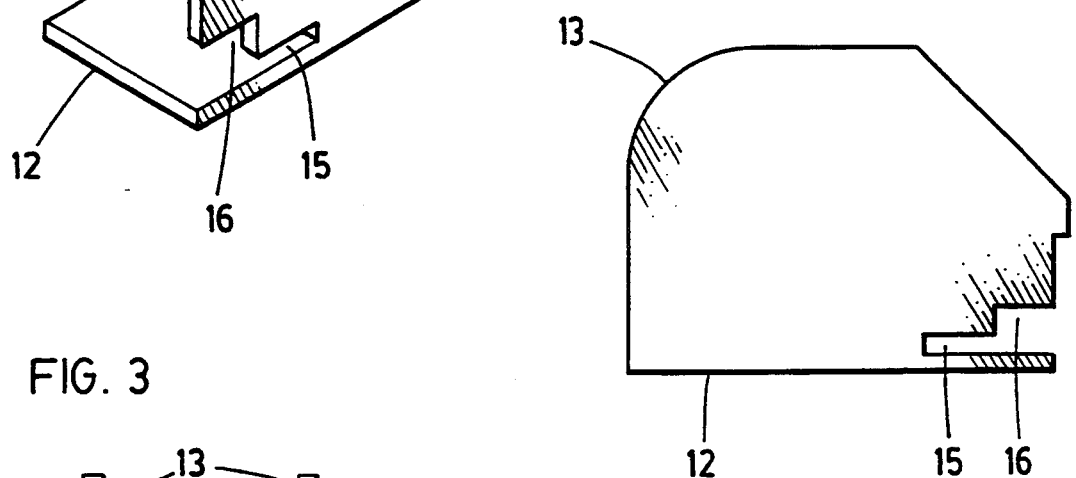
FIG. 2 is a plan side view of the clip of FIG. 1.
Figure 3:
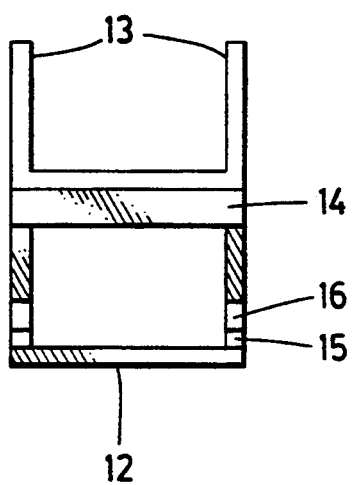
FIG. 3 is a plan front view of the clip of FIGS. 1 & 2.

Referring to FIG. 1, the clip 10 of the present invention is a generally U-shaped channel with base 12 and a pair of opposite vertical walls 13. The clip 10 can be formed from sheet metal or moulded from plastic or other suitable material. A reinforcing cross-member 14 is optionally provided at the front of the clip 10 to provide support for the walls 13 and to prevent the tape measure from pulling out of the clip. A horizontal slot 15 is provided in walls 13 adjacent to the base 12 at the front of the walls 13.

In an alternative embodiment the slot 15 or a portion of the slot can be formed in the top surface of the base 12. This option may be particularly suitable where the clip is moulded from plastic. Slot 15 can further be modified to include cut out 16 at the open end of the slot so that different thicknesses of straight edges can be accommodated. Alternatively slot 15 could be tapered to do the same thing.

Figure 4:
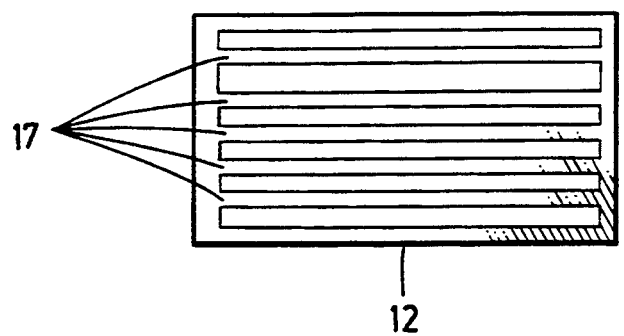
FIG. 4 is a bottom plan view of the clip of FIGS. 1, 2 & 3.

FIG. 4 shows the base 12 having a series of parallel reinforcing ribs 17 on its bottom surface. Where the clip is moulded or cast these ribs can be provided.

Figure 5:
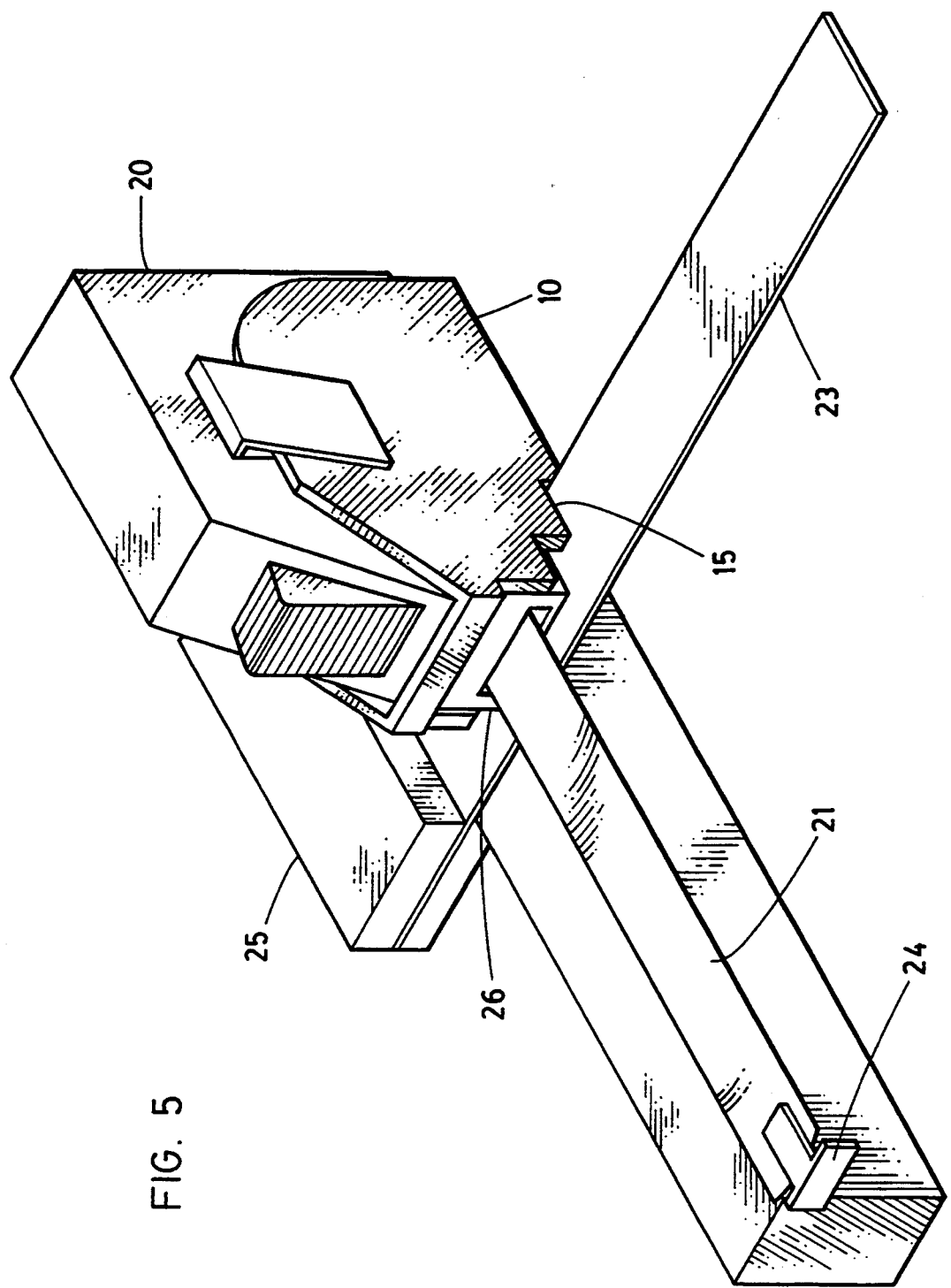
FIG. 5 is a perspective view of the clip of the present invention together with a tape measure and square illustrating the use of the present invention.

FIG. 5 illustrates the application of the present invention. A standard retractable tape measure 20 is inserted in clip 10 with the tape 21 projecting out the open front end 26 of the clip. The blade or ruler 23 of a square 25 or other straight edge is inserted into slot 15. The tape 21 lies over top of the ruler 23. The tape has a downwardly projecting tip 24 at its starting end. This tip hooks onto the end of a piece of wood or other article you want to mark at various intervals and then scribe a straight line across the marks. The edge of the square runs along the edge of the stud. As the square is moved along the stud the clip and tape measure are moved at the same time. This permits the operation of the tape and square with one hand and permits the operator's other hand to mark and scribe lines as the square/clip/tape measure combination are moved along.

An alternative to the clip illustrated in FIGS. 1 to 5 would be to incorporate the slot directly into the housing for the tape measure itself.

It will be appreciated that the above description related to the preferred embodiment by way of example only. Many variations on the invention will be obvious to those knowledgeable in the field, and such obvious variations are within the scope of the invention as described and claimed, whether or not expressly described.

What is claimed as the invention:

1. A clip for use with a tape measure comprising a generally U-shaped channel sized to permit a standard tape measure to be retained in the channel, said channel having a base, two generally parallel vertical side walls and a cross member connecting said vertical side walls at a first end of said channel without fully enclosing said first end, where a pair of horizontal slots are cut in the lower edge of said vertical side walls adjacent the first end of the channel, said slots sized to permit the ruler of a square or other straight edge to be inserted and held in place between the bottom of the tape measure inserted in said clip and the base of the channel.

2. The clip of claim 1 wherein the slots are adopted to accommodate rulers of various thicknesses.

3. The clip of claim 1 formed of plastic.

4. The clip of claim 3 wherein the base of the clip is recessed adjacent the slot to accommodate the ruler or other straight edge.

* * * * *